United States Patent
Cao et al.

(10) Patent No.: US 9,982,136 B2
(45) Date of Patent: May 29, 2018

(54) WATERBORN POLYMER-MODIFIED EMULSIFIED ASPHALT MIXTURE AND PROCESS FOR PRODUCING THE SAME

(71) Applicants: Research Institute of Highway Ministry of Transport, Beijing (CN); Beijing University of Civil Engineering and Architecture, Beijing (CN); Zhonglu Hi-Tech (Beijing) Highway Technology Co., Ltd, Beijing (CN)

(72) Inventors: Dongwei Cao, Beijing (CN); Yanjun Zhang, Beijing (CN); Jie Ji, Beijing (CN); Haiyan Zhang, Beijing (CN)

(73) Assignees: RESEARCH INSTITUTE OF HIGHWAY MINISTRY OF TRANSPORT, Beijing (CN); ZHOUNGLU HI-TECH (BEIJING) HIGHWAY TECHNOLOGY CO., LTD, Beijing (CN)

( * ) Notice: Subject to any disclaimer, the term of this patent is extended or adjusted under 35 U.S.C. 154(b) by 238 days.

(21) Appl. No.: 14/823,877

(22) Filed: Aug. 11, 2015

(65) Prior Publication Data
US 2016/0185966 A1    Jun. 30, 2016

(30) Foreign Application Priority Data

Aug. 11, 2014  (CN) .......................... 2014 1 0391877
Aug. 26, 2014  (CN) .......................... 2014 1 0426285
Jul. 17, 2015   (CN) .......................... 2015 1 0423651

(51) Int. Cl.
C08K 3/36   (2006.01)
C08L 95/00  (2006.01)
C08K 3/00   (2018.01)
C08K 3/34   (2006.01)
C08L 75/04  (2006.01)

(52) U.S. Cl.
CPC .......... *C08L 95/005* (2013.01); *C08K 3/0033* (2013.01); *C08K 3/34* (2013.01); *C08L 75/04* (2013.01); *C08L 2555/28* (2013.01); *C08L 2555/52* (2013.01); *C08L 2555/80* (2013.01)

(58) Field of Classification Search
CPC . C08L 95/005; C08L 2555/28; C08L 2555/80
See application file for complete search history.

(56) References Cited

U.S. PATENT DOCUMENTS

| | | | |
|---|---|---|---|
| 2005/0124736 A1 | 6/2005 | Bonnet et al. | |
| 2009/0092846 A1* | 4/2009 | Takamura | C04B 41/009 428/480 |
| 2014/0348776 A1* | 11/2014 | Palmer, Jr. | C09D 7/001 424/78.09 |
| 2016/0194580 A1* | 7/2016 | Cao | C10C 3/04 524/71 |
| 2016/0297968 A1* | 10/2016 | Cao | C08K 5/34924 |

FOREIGN PATENT DOCUMENTS

| | | |
|---|---|---|
| CN | 102321372 A | 1/2012 |
| CN | 103773026 A | 5/2014 |
| CN | 103773029 A | 5/2014 |
| CN | 103951323 A | 7/2014 |

OTHER PUBLICATIONS

The Shell Bitumen Handbook, 5th Edition (2003).
Basic Asphalt Emulsion Manual, MS-19, 4th Edition (2008).

* cited by examiner

*Primary Examiner* — Hannah Pak
(74) *Attorney, Agent, or Firm* — Kilpatrick Townsend & Stockton LLP

(57) ABSTRACT

This present invention discloses a waterborne polymer modified emulsified asphalt mixture and the preparation method thereof, and particularly relates to a waterborne polyurethane emulsified asphalt concrete, a waterborne acrylic resin emulsified asphalt concrete, and a waterborne epoxy resin emulsified asphalt micro-surfacing mixture, and preparation methods thereof. A mixture containing a waterborne polymer modified emulsified asphalt forms a high-performance composite system having a spatial network structure, and has good performance and simple preparation process.

4 Claims, No Drawings

WATERBORN POLYMER-MODIFIED EMULSIFIED ASPHALT MIXTURE AND PROCESS FOR PRODUCING THE SAME

TECHNICAL FIELD

This present invention belongs to the field of road engineering, discloses a waterborne polymer modified emulsified asphalt mixture and the preparation method thereof, and particularly relates to a waterborne polyurethane modified emulsified asphalt concrete, a waterborne acrylic resin modified emulsified asphalt concrete, and a waterborne epoxy resin modified emulsified asphalt micro-surfacing mixture, and preparation methods thereof.

BACKGROUND ART

Conventional cold-mixed asphalt mixtures can achieve mixing construction at normal temperature to some extent so as to reduce the consumption of energy. However, cold-mixed asphalt mixtures have poor pavement performance, which fail to satisfy the requirements of modern road surfaces on asphalt materials and can be only used for low-quality road surface pavements or small-range repairing.

A waterborne polyurethane emulsion refers to a polyurethane which uses water as a dispersion medium and is free of or contains little amount of organic solvent in the system, and inherits excellent properties of solvent-type polyurethanes such as good low-temperature resistance, good abrasion resistance, high adhesion, etc., while it has the advantages of no pollution, good safety and reliability, good compatibility, easiness of modification, etc. It has gradually substituted solvent-type polyurethanes and is widely used in coatings, adhesives, fabric coatings and finishing agents, leather finishing agents, paper surface treating agents, fiber surface treating agents, etc. As an emulsified asphalt modifier, it has good physical and chemical properties and can significantly improve the pavement performance of emulsified asphalt.

Patent CN201110188772.9 discloses a waterborne polyurethane epoxy resin modified emulsified asphalt, which is formed by forming a polyurethane epoxy resin by a reaction with epoxy chloropropane or an epoxy resin after the chain extension of isocyanate with a polyol, forming a waterborne polyurethane epoxy resin by the association with a polyether polyol emulsifier, an auxiliary and water, modifying an emulsified asphalt, and curing with a modified fatty amine epoxy resin curing agent. It has a complicated process of synthesis and a lot of influential factors, and is difficult to ensure the uniformity; and meanwhile, the content of waterborne polyurethane is too low, which insufficiently contributes to the strength, and the application performance of this material is not evaluated in this patent.

An acrylate monomer has a carbon-carbon unsaturated double bond and forms an acrylate resin through a polymerization reaction. Acrylate resin does not only have very high photostability, thermal stability, and chemical stability, but also has the advantages of excellent weather resistance, corrosion resistance, chemical resistance, stain resistance, high adhesion, etc. Also, it has the features of abundant sources of raw materials and relatively low cost. In the wider sense, a waterborne acrylic resin comprises a waterborne acrylic resin emulsion, a waterborne acrylic resin dispersion in water, and an waterborne acrylic resin solution in water. They possess important applications in building coatings, but have not been used in roads yet.

As an asphalt modifier, the waterborne acrylic resin emulsion has good physical and chemical properties, and may improve the resistance of asphalt to corrosion by acids, alkalis, and organic solvents, improve high-temperature and low-temperature properties of asphalt, reduce the sensitivity of asphalt to temperature, increase the elasticity of asphalt, reduce aging tendency of asphalt, improve the adhesion of asphalt to stone materials, and improve the fatigue resistance of asphalt, so as to overall improve the pavement performance of emulsified asphalt. In recent years, there have been related studies in China, for example, Chinese Patent Application No. 201410023492.6 discloses a preparation method of an acrylic resin emulsified asphalt, which is studied mainly aiming at the technical problems that emulsified asphalt has long drying time and poor water resistant properties, and is mainly a water-resistant emulsified asphalt material. Chinese Patent Application No. 201410023481.8 discloses a preparation method of a urea resin emulsified asphalt, which has long reaction time and complex operation required for the synthesis of the urea resin emulsified asphalt.

After years' normal operation of a highway, rut and cracks will occur on part of the road surface. Although the function of the road surface is not influenced transitorily, utilization properties of the road surface will be reduced and the useful life will be shortened, if treatment is not timely performed.

Micro-surfacing is the highest form of an emulsified asphalt slurry overlay, which is a preventive curing technical measure developed on the basis of slurry seals, and is suitable for the preventive curing of important traffic roads, such as highways, city main roads, airport runways, etc. Micro-surfacing may improve slip resistance, repair slight surface unevenness and rut, prevent infiltration of water, and prevent aging and loosening of the road surface, so as to significantly improve utilization properties of the road surface and effectively elongate the useful life of the road surface; as a preventive maintenance technology, micro-surfacing may also be directly used for a surface wearing course of a newly built road so as to reduce the use of expensive stone materials, to decrease construction cost, and to significantly reduce the occurrence of early water damage; and furthermore, micro-surfacing further has the advantages of good convenience for construction, low construction cost, short time to open traffic, etc., and has a very wide prospect for application.

Micro-surfacing is a thin layer structure, wherein a polymer modified emulsified asphalt, a mineral aggregate, water, and an additive are mixed in a certain weight ratio and paved on a road surface by specialized equipment and the traffic is opened rapidly. It has high requirements for constituent materials: firstly, the aggregate used must be firm, wear resistant, and clean, and type II or type III gradation is typically used as the gradation of the stone material; and secondly, in order to ensure a better adhesion between the asphalt and the stone material, a cationic emulsified asphalt is typically used, and polymer modification is needed, and SBR latex or SBS is typically used for modification, so as to ensure that a micro-surfacing overlay may still achieve a relatively long useful life even under the action of heavy traffic.

As an emulsified asphalt modifier, the waterborne epoxy resin itself has good physical and chemical properties and can significantly improve the pavement performance of emulsified asphalt. However, pH is required to be adjusted to about 2-3 in the preparation process of a cationic emulsified asphalt, while the addition of a waterborne epoxy resin emulsion containing an amine-type curing agent will disrupt the equilibrium system of the cationic emulsified asphalt, leading to the failure of the effect of emulsification, and has a significant phenomenon of caking.

Current studies in the art are mainly focusing on the modified emulsified asphalt material itself, while studies on waterborne polymer modified emulsified asphalt mixtures have not been prevalent yet. The emulsified asphalt mixture said herein refers to a mixture containing emulsified asphalt used in engineering, particularly road engineering, which may be, for example, used for asphalt concrete pavement materials, asphalt road surface repair materials, slurry seals for curing, micro-surfacing, asphalt mortar for high-speed railways, etc.

However, in the field of road engineering, there remains a need for developing a waterborne polymer modified emulsified asphalt mixture having a simple preparation method and good properties.

SUMMARY OF THE INVENTION

The object of this present invention is to provide a novel waterborne polymer modified emulsified asphalt mixture for pavement and the preparation method thereof, with respect to the above problems present in the prior art. In one aspect, an object of this present invention is to provide a waterborne polymer modified emulsified asphalt concrete and the preparation method thereof. An waterborne polymer has better compatibility and stability after being mixed with an emulsified asphalt, and by the action of the self-crosslinking curing of the waterborne polymer after being mixed with an aggregate, forms a high-performance composite system having a spatial network structure, which has the functions of reinforcing, infiltration resistance, and chemical resistance, and may be evaporated and cured under the condition of normal temperature without generation of alligator cracks. In another aspect, an object of this present invention is to provide a waterborne polymer modified emulsified asphalt mixture used for micro-surfacing. It uses a waterborne polymer to modify an anionic emulsified asphalt, which thereby has the good properties of abrasion resistance, water damage resistance, and rut resistance.

An embodiment of this invention provides a waterborne polyurethane emulsified asphalt concrete, comprising raw materials: a mineral aggregate, an emulsified asphalt, and a waterborne polyurethane emulsion, wherein the weight ratio of the mineral aggregate, the waterborne polyurethane emulsion, and the emulsified asphalt is 100:1-20:7-20.

In the above, the mineral aggregate is basalt or limestone.

Particularly, the mineral aggregate is composed of a crude aggregate, a fine aggregate, and a filler, wherein the weight ratio of the crude aggregate, the fine aggregate, and the filler is 30-70:30-70:5-10, the crude aggregate has a nominal particle size of $\delta > 4.75$ mm, the fine aggregate has a nominal particle size of $\delta \leq 4.75$ mm, the filler has a nominal particle size of $\delta \leq 0.075$ mm.

In the above, the waterborne polyurethane emulsion is an emulsified liquid or dispersion of waterborne polyurethane, which has a solid content of 30%-70%.

Particularly, the waterborne polyurethane emulsion may be a linear molecule type polyurethane emulsion or a crosslinking type polyurethane emulsion.

In the above, the emulsified asphalt has a solid content of 40%-75%.

Particularly, the preparation of the emulsified asphalt comprises preparing the emulsified asphalt, comprising the steps as follows:

1) mixing water and an emulsifier, stirring at 55-65° C., and sufficiently dissolving to obtain a uniform emulsion;
2) heating an asphalt to 120-160° C.; and
3) pouring the heated asphalt into the uniform emulsion for emulsification with an emulsification time of 2-5 min;

wherein the weight ratio of the asphalt:the water:the emulsifier is 40-80:25-60:1-3.

Particularly, the emulsifier in step 1) is one or more of an anionic emulsifier, a cationic emulsifier, or a nonionic emulsifier.

A plurality of emulsifiers having the same polarity may be used in combination; and a nonionic emulsifier may also be used in combination with an anionic emulsifier or a cationic emulsifier.

Particularly, step 1) further comprises controlling pH value of the uniform emulsion at 11.5-12.5 by using a sodium hydroxide buffer when the emulsifier is an anionic emulsifier; and step 1) further comprises controlling pH value of the uniform emulsion at 2-3 by using a hydrochloric acid buffer when the emulsifier is cationic emulsifier.

An embodiment of this invention provides a method for the waterborne polyurethane emulsified asphalt concrete described above, comprising the steps as follows:

1) mixing a waterborne polyurethane emulsion and an emulsified asphalt, and uniformly stirring to obtain a waterborne polyurethane modified emulsified asphalt for standby; and
2) adding the waterborne polyurethane modified emulsified asphalt to a mineral aggregate, uniformly stirring, and curing, so as to obtain a waterborne polyurethane emulsified asphalt concrete;

wherein the time of stirring in step 1) is 2-10 min; and wherein the time of stirring in step 2) is 60-300 s.

An embodiment of this invention provides a method for the waterborne polyurethane emulsified asphalt concrete described above, comprising: uniformly stirring a mineral aggregate, an emulsified asphalt, and a waterborne polyurethane emulsion, and curing, so as to obtain a waterborne polyurethane emulsified asphalt concrete;

wherein the time of stirring is 30-300 s.

The waterborne polyurethane emulsified asphalt concrete of this present invention may be used in the preparation of asphalt concrete pavement materials, asphalt road surface repair materials, slurry seals for curing, micro-surfacing, asphalt mortar for high-speed railways, etc.

An embodiment of this invention provides a waterborne acrylic resin emulsified asphalt concrete, comprising:

a mineral aggregate; and a waterborne acrylic resin modified emulsified asphalt mixed and stirred with the mineral aggregate;

wherein the ratio of parts by weight of the mineral aggregate to the waterborne acrylic resin modified emulsified asphalt is 100:5-40.

In the above, the mineral aggregate is basalt or limestone, or a stone material which satisfies current technical standards and specifications.

Particularly, the mineral aggregate is composed of a crude aggregate, a fine aggregate, and a filler, wherein the weight ratio of the crude aggregate, the fine aggregate, and the filler is 30-70:30-70:5-10, the crude aggregate has a nominal particle size of $\delta > 4.75$ mm, the fine aggregate has a nominal particle size of $\delta \leq 4.75$ mm, the filler has a nominal particle size of $\delta \leq 0.075$ mm.

In the above, the waterborne acrylic resin modified emulsified asphalt comprises:

a soap liquid produced by mixing and stirring water and an emulsifier;

a monomer mixture and an initiator used to be added to the soap liquid to form a mixed liquid; and an asphalt added to the mixed liquid;

In the above, during the addition of the monomer mixture and initiator to the emulsion, stirring is performed at a temperature of 65-85° C.; and the monomer mixture is dropwise added, the initiator is added in batches after dissolved with deionized water, stirring is continued for 10-30 min after the dropwise addition of the monomer mixture is complete, and then the pH of the mixed liquid is adjusted to 10-12;

wherein the asphalt is added to the mixed liquid when heated to 100-170° C.

Particularly, the ratio of parts by weight of the soap liquid, the monomer mixture, the initiator, and the asphalt is 41-73 of the soap liquid, 30-60 of the monomer mixture, 0.3-0.7 of the initiator, and 40-80 of the asphalt.

In the above, 1-3 parts of the emulsifier and 40-70 parts of deionized water are mixing and stirred to dissolve the emulsifier in water to produce the soap liquid.

Particularly, the emulsifier is an anionic emulsifier, including but not limited to, dodecyl sodium sulfate, dodecyl sodium sulfonate or dodecyl sodium benzene sulfonate.

Particularly, the speed of stirring is 500-1000 r/min.

In the above, the monomer mixture is dropwise added to the emulsion, the initiator is added to the emulsion in batches after dissolved with deionized water, and stirring is performed at a temperature of 65-85° C. for 2-5 min.

Particularly, the speed of stirring is 500-1000 r/min.

Particularly, the monomer mixture is a mixture of any two or more of acrylic acid, n-butyl acrylate, methyl methacrylate, ethyl methacrylate, lauryl acrylate, and acrylamide.

Particularly, the initiator is a persulfate, including but not limited to ammonium persulfate, potassium persulfate, and sodium persulfate.

Particularly, stirring is continued for 10-30 min after the dropwise addition of the monomer mixture is complete.

In the above, the pH of the mixed liquid is adjusted to 10-12.

Particularly, the pH of the mixed liquid is adjusted to 10-12 by using an alkaline solution.

Particularly, the alkaline solution is preferably a sodium hydroxide solution.

In the above, the asphalt is heated to 100-170° C. and is slowly added to the mixed liquid, and stirring is continuously performed to obtain a waterborne acrylic resin modified emulsified asphalt.

Particularly, the speed of stirring is 1000-3000 r/min.

In the above, the mineral aggregate and the waterborne acrylic resin modified emulsified asphalt are mixed, uniformly stirred, and cured to obtain the waterborne acrylic resin emulsified asphalt concrete.

Particularly, the time of stirring is 30-300 s.

In the above, the waterborne acrylic resin emulsified asphalt concrete is prepared by the method as follows:

an emulsifier and water is mixed and uniformly stirred to prepare a soap liquid; the monomer mixture is dropwise added to the soap liquid, the initiator is added to the soap liquid in batches after dissolved with deionized water, and stirring is performed at a temperature of 65-85° C.; stirring is continued for 10-30 min after the dropwise addition of the monomer mixture is complete, and then the pH of the mixed liquid is adjusted to 10-12; the asphalt heated to 100-170° C. is added to the mixed liquid with pH adjusted to 10-12, and stirring is uniformly performed to obtain a waterborne acrylic resin emulsified asphalt; the waterborne acrylic resin emulsified asphalt and the mineral aggregate are mixed, uniformly stirred, and cured to obtain the waterborne acrylic resin emulsified asphalt concrete.

The use of the waterborne acrylic resin modified emulsified asphalt may improve high-temperature and low-temperature properties of asphalt, reduce the sensitivity of asphalt to temperature, increase the elasticity of asphalt, reduce aging tendency of asphalt, improve the adhesion of asphalt to stone materials, and improve the fatigue resistance of asphalt.

An embodiment of this invention provides an acrylic resin emulsified asphalt, comprising:

a mineral aggregate; and a waterborne acrylic resin and an emulsified asphalt mixed and stirred with the mineral aggregate;

wherein the ratio of parts by weight of the mineral aggregate, the waterborne acrylic resin, and the emulsified asphalt is 100:1-20:4-20.

In the above, the mineral aggregate is basalt or limestone, or a stone material which satisfies current technical standards and specifications.

Particularly, the mineral aggregate is composed of a crude aggregate, a fine aggregate, and a filler.

Particularly, the weight ratio of the crude aggregate, the fine aggregate, and the filler is 30-70:30-70:5-10.

In the above, the crude aggregate has a nominal particle size of $\delta > 4.75$ mm, the fine aggregate has a nominal particle size of $\delta \leq 4.75$ mm, the filler has a nominal particle size of $\delta \leq 0.075$ mm.

In the above, the emulsified asphalt comprises:

a soap liquid produced by mixing and stirring water and an emulsifier;

an asphalt used to be mixed with the soap liquid for emulsification;

wherein the pH of the soap liquid is adjusted to 10-12, the asphalt is heated to 100-170° C. and is added to the soap liquid, and emulsification is performed for 2-5 min.

Particularly, the ratio of parts by weight of the water, the emulsifier and the asphalt is 25-60:1-3:40-80.

Particularly, the water and the emulsifier are mixed and uniformly stirred at 30-70° C. to prepare the soap liquid.

Particularly, the emulsifier is an anionic emulsifier, including but not limited to, dodecyl sodium sulfate, dodecyl sodium sulfonate or dodecyl sodium benzene sulfonate.

In the above, the waterborne acrylic resin emulsion is an emulsion or a dispersion of a waterborne acrylic resin, having a solid content of 30-70%.

In the above, the mineral aggregate, the waterborne acrylic resin, and the emulsified asphalt are mixed, uniformly stirred, and cured to obtain the waterborne acrylic resin emulsified asphalt concrete.

Particularly, the time of stirring is 30-300 s.

In the above, the waterborne acrylic resin emulsified asphalt concrete is prepared by the method as follows:

an emulsifier and water is mixed and uniformly stirred to prepare a uniform soap liquid; the asphalt heated to 100-170° C. is added to the uniform soap liquid for emulsification to prepare an emulsified asphalt; the waterborne acrylic resin emulsion and the emulsified asphalt are mixed and uniformly stirred to obtain the a waterborne acrylic resin modified emulsified asphalt; the waterborne acrylic resin modified emulsified asphalt and the mineral aggregate are mixed, uniformly stirred, and cured to obtain the waterborne acrylic resin emulsified asphalt concrete.

The waterborne acrylic resin emulsified asphalt concrete of this present invention may be used in the preparation of asphalt concrete pavement materials, asphalt road surface repair materials, slurry seals for curing, micro-surfacing, asphalt mortar for high-speed railways, etc.

The waterborne polymer modified emulsified asphalt concrete of this present invention does not only have the advantages of conventional cold-mixed asphalt concrete, but also has good mechanical properties and stability as well as excellent pavement performance. The useful life of the road surface is greatly elongated and curing time is shortened so that traffic may be opened in 1-3 days. As a cold-mixed cold-paved asphalt concrete, it may be both used in pavement and repair of asphalt road surfaces and used in cold-mixed materials, slurry seals, micro-surfacing, etc. It has simple operation in production and construction as well as wide application, and is not limited by the conditions of transportation, repair, dispersion, etc. With respect to the hot-state technology for conventional hot-mixed hot-paved mixtures, energy consumption and the emission of toxic and harmful gases in the process of heating are reduced, and energy saving and emission reduction are achieved.

The waterborne polyurethane, which is used for the first time in this present invention, inherits excellent properties of solvent-type polyurethanes such as good low-temperature resistance, high abrasion resistance, high elasticity, high adhesion, etc., while it has the advantages of no pollution, good safety and reliability, good compatibility, easiness of modification, etc. By preparing the waterborne polyurethane emulsion with the waterborne polyurethane, the process is simple, no organic solvent is contained, and the compatibility and the stability with emulsified asphalt are good. By the action of the self-crosslinking curing of the waterborne polymer after being mixed with an aggregate, this present invention forms a high-performance composite system having a spatial network structure, which may be evaporated and cured under the environment of normal temperature without generation of alligator cracks and further provision and addition of a curing agent.

The waterborne acrylic acid modified emulsification asphalt emulsion, which is used for the first time in this present invention, has simple process, is free of organic solvent, has good compatibility, and forms a high-performance composite asphalt system having a spatial network structure by the action of the self-crosslinking curing of the waterborne acrylic acid, so as to greatly improve the properties of the emulsified asphalt and can be stably stored.

An embodiment of this invention provides a waterborne epoxy resin emulsified asphalt mixture used for micro-surfacing, characterized by comprising raw materials having the ratio of parts by weight as follows:

| | |
|---|---|
| a mineral aggregate | 100 |
| an anionic emulsified asphalt | 10-15 |
| a waterborne epoxy resin emulsion | 0.5-12 |
| water | 6-11 |

Particularly, the mixture further comprises an additive, and the weight ratio of the mineral aggregate to the additive is 100:1-3.

In the above, the additive is one or more of cement, slaked lime, fiber, and a flocculant.

Particularly, the flocculant may be one of aluminum sulfate, iron sulfate, or polyacrylamide.

In the above, the mineral aggregate is composed of a crude aggregate, a fine aggregate, and a filler; wherein the weight ratio of the crude aggregate, the fine aggregate, and the filler is 10-30:55-85:5-15; the crude aggregate has a nominal particle size of 4.75 mm<$\delta$≤9.5 mm; the fine aggregate has a nominal particle size of $\delta$≤4.75 mm; the filler has a nominal particle size of $\delta$≤0.075 mm.

In the above, the waterborne epoxy resin emulsion comprises a waterborne epoxy resin and a waterborne epoxy curing agent, and the weight ratio of the waterborne epoxy resin to the waterborne epoxy curing agent is 1:1-2.

Particularly, the waterborne epoxy resin emulsion further comprises water, and the ratio of the waterborne epoxy resin to the water is 1:1-5.

In the above, the waterborne epoxy resin is a water-soluble epoxy resin or a standard liquid epoxy resin having a solid content of 50-100%.

In the above, the waterborne epoxy curing agent is a polyamine-type curing agent emulsion having a solid content of 30-70%.

Particularly, the polyamine-type curing agent further comprises a modified polyamine-type curing agent.

An embodiment of this invention provides a preparation method of the mixture described above, characterized by comprising the steps as follows:

1) preparing a mineral aggregate suitable for mixing;
2) mixing a waterborne epoxy resin emulsion and an emulsified asphalt, and uniformly stirring to obtain a waterborne epoxy resin modified emulsified asphalt for stand-by;
3) adding water to the prepared mineral aggregate, and sufficiently stirring to wet the mineral aggregate; and
4) adding the waterborne epoxy resin modified emulsified asphalt to the wetted mineral aggregate, uniformly stirring, and curing, so as to obtain a micro-surfacing mixture;

wherein the weight ratio of the mineral aggregate, the waterborne epoxy resin emulsion, the emulsified asphalt and the water is 100:0.5-12:10-15:6-11;

wherein the time of stirring in step 4) is 30 s-180 s.

Particularly, the mineral aggregate suitable for mixing is prepared by mixing a crude aggregate, a fine aggregate and a filler, the weight ratio of the crude aggregate, the fine aggregate, and the filler is 10-30:55-85:5-15; the crude aggregate has a nominal particle size of 4.75 mm<$\delta$≤9.5 mm; the fine aggregate has a nominal particle size of $\delta$≤4.75 mm; the filler has a nominal particle size of $\delta$≤0.075 mm.

Particularly, the mineral aggregate suitable for mixing is formed by adding an additive after mixing a crude aggregate, a fine aggregate and a filler, the weight ratio of the crude aggregate, the fine aggregate, and the filler is 10-30:55-85:5-15; the crude aggregate has a nominal particle size of 4.75 mm<$\delta$≤9.5 mm; the fine aggregate has a nominal particle size of $\delta$≤4.75 mm; the filler has a nominal particle size of $\delta$≤0.075 mm, and the weight ratio of the mineral aggregate to the additive is 100:1-3.

Particularly, the waterborne epoxy resin emulsion is formed by mixing and stirring a waterborne epoxy resin and a waterborne epoxy curing agent with a stirring time of 5-10 min. In the above, the weight ratio of the waterborne epoxy resin and the waterborne epoxy curing agent is 1:1-2.

Particularly, the waterborne epoxy resin emulsion is prepared by mixing and stirring a waterborne epoxy resin and a waterborne epoxy curing agent for 5-10 min and then adding water. In the above, the weight ratio of the waterborne epoxy resin, the waterborne epoxy curing agent, and the water is 1:1-2:1-5.

An embodiment of this invention provides a preparation method of the mixture, comprising the steps as follows:

1) preparing a mineral aggregate suitable for mixing;
2) adding water to the prepared mineral aggregate, and sufficiently stirring to wet the mineral aggregate; and 3) adding a waterborne epoxy resin emulsion and an emulsified asphalt to the wetted mineral aggregate, uniformly stirring, and curing, so as to obtain a micro-surfacing mixture;

wherein the weight ratio of the mineral aggregate, the additive, the waterborne epoxy resin emulsion, the emulsified asphalt and the water is 100:0.5-12:10-15:6-11;

wherein the time of stirring in step 3) is 30 s-180 s.

Particularly, the mineral aggregate suitable for mixing is prepared by mixing a crude aggregate, a fine aggregate and a filler, the weight ratio of the crude aggregate, the fine aggregate, and the filler is 10-30:55-85:5-15; the crude aggregate has a nominal particle size of 4.75 mm<δ≤9.5 mm; the fine aggregate has a nominal particle size of δ≤4.75 mm; the filler has a nominal particle size of δ≤0.075 mm.

Particularly, the mineral aggregate suitable for mixing is prepared by adding an additive after mixing a crude aggregate, a fine aggregate and a filler, the weight ratio of the crude aggregate, the fine aggregate, and the filler is 10-30:55-85:5-15; the crude aggregate has a nominal particle size of 4.75 mm<δ≤9.5 mm; the fine aggregate has a nominal particle size of δ≤4.75 mm; the filler has a nominal particle size of δ≤0.075 mm, and the weight ratio of the mineral aggregate to the additive is 100:1-3.

Particularly, the waterborne epoxy resin emulsion is formed by mixing and stirring a waterborne epoxy resin and a waterborne epoxy curing agent with a stirring time of 5-10 min. In the above, the weight ratio of the waterborne epoxy resin and the waterborne epoxy curing agent is 1:1-2.

Particularly, the waterborne epoxy resin emulsion is prepared by mixing and stirring a waterborne epoxy resin and a waterborne epoxy curing agent for 5-10 min and then adding water. In the above, the weight ratio of the waterborne epoxy resin, the waterborne epoxy curing agent, and the water is 1:1-2:1-5.

The advantageous effects of the waterborne epoxy resin emulsified asphalt mixture used for micro-surfacing in this present invention are shown by the following aspects:

1) The anionic emulsified asphalt is used in micro-surfacing mixtures for the first time in this present invention. Anions have poor adhesion with stone materials and are typically not used in the preparation of micro-surfacing mixtures. Upon modification by a waterborne epoxy resin emulsion, they have not only improved adhesion with stone materials, but also have good compatibility and stability with the emulsified asphalt, while the phenomenon of caking generated by the amine-type curing agent in the cationic emulsified asphalt and the waterborne epoxy resin emulsion are prevented, and emulsifying properties are excellent.

2) In the waterborne epoxy resin emulsified asphalt micro-surfacing mixture of this invention, a crosslinking reaction occurs between the waterborne epoxy resin and the waterborne epoxy curing agent under the condition of normal temperature to form a high-performance composite system having a spatial network structure, and the properties of the micro-surfacing such as abrasion resistance, water damage resistance, and rut resistance are greatly improved, so as to improve road-surface travelling quality and elongate the useful life of the road surface.

DESCRIPTION OF EMBODIMENTS

This present invention will be further described below in conjunction with specific examples, and the advantages and features of this invention will be clearer with description. However, these examples are merely exemplary and will in no way limit the scope of this invention. It is to be understood the person skilled in the art that amendments or replacements may be performed on details and forms of the technical solutions of this present invention without departing from the spirit and scope of this invention, and all of these amendments and replacements fall in the scope of this invention.

Example I-1

Preparation of Emulsified Asphalt

Materials were prepared according to the following weight proportion:

| Asphalt | 110 g |
|---|---|
| water | 90 g |
| dodecyl sodium sulfonate | 4 g |

Water and dodecyl sodium sulfonate were mixed and stirred at 60° C. and were sufficiently dissolved to obtain a uniform emulsion, pH of the emulsion was controlled at 12 by using a sodium hydroxide buffer; an asphalt was heated to 140° C. and poured into the prepared uniform emulsion for emulsification with an emulsification time of 4 min; and the prepared emulsified asphalt had a solid content of 54%.

2) Preparation of Waterborne Polyurethane Emulsified Asphalt Concrete 100 g of the emulsified asphalt and 40 g of a waterborne polyurethane emulsion were mixed and sufficiently stirred by using a low-speed stirrer for 5 min to prepare a uniform nonviscous brown mixture, which was a waterborne polyurethane emulsification asphalt emulsion.

The waterborne polyurethane emulsification asphalt emulsion was placed in a mixing pot, 1000 g of a mineral aggregate was added, stirring was performed at normal temperature for 140 s, and curing was performed to obtain a waterborne polyurethane emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 60:40:8, the crude aggregate had a nominal particle size of >4.75 mm, the fine aggregate had a nominal particle size of δ≤4.75 mm, the filler had a nominal particle size of δ≤0.075 mm.

In the above, the waterborne polyurethane emulsion was a commercially available linear molecule type waterborne polyurethane emulsion having a solid content of 55%.

Example I-2

1) Preparation of Emulsified Asphalt

Materials were prepared according to the following weight proportion:

| Asphalt | 160 g |
|---|---|
| water | 50 g |
| octylphenol polyoxyethylene ether | 2 g |

Water and octylphenol polyoxyethylene ether were mixed and stirred at 55° C., and were sufficiently dissolved to obtain a uniform emulsion; an asphalt was heated to 120° C. and poured into the prepared uniform emulsion for emulsification with an emulsification time of 5 min; and the prepared emulsified asphalt had a solid content of 75%.

2) Preparation of Waterborne Polyurethane Emulsified Asphalt Concrete 200 g of the nonionic emulsified asphalt and 10 g of a waterborne polyurethane emulsion were mixed and sufficiently stirred by using a low-speed stirrer for 10 min to prepare a uniform nonviscous brown mixture, which was a waterborne polyurethane emulsification asphalt emulsion.

The waterborne polyurethane emulsification asphalt emulsion was placed in a mixing pot, 1000 g of a mineral aggregate was added, stirring was performed at normal temperature for 300 s, and curing was performed to obtain a waterborne polyurethane emulsified asphalt concrete.

In the above, the mineral aggregate was basalt; the aggregate was composed of a crude aggregate, a fine aggregate, and a filler, the weight ratio of the crude aggregate, the fine aggregate, and the filler was 50:50:10, the crude aggregate had a nominal particle size of >4.75 mm, the fine aggregate had a nominal particle size of $\delta \leq 4.75$ mm, the filler had a nominal particle size of $\delta \leq 0.075$ mm.

In the above, the waterborne polyurethane emulsion was a commercially available crosslinking type waterborne polyurethane emulsion having a solid content of 70%.

Example I-3

1) Preparation of Emulsified Asphalt

Materials were prepared according to the following weight proportion:

| Asphalt | 40 g |
|---|---|
| Water | 60 g |
| Cetyltrimethylammonium chloride | 1 g |

Water and cetyltrimethylammonium chloride were mixed and stirred at 65° C. and were sufficiently dissolved to obtain a uniform emulsion, pH of the emulsion was controlled at 3 by using a hydrochloric acid buffer; an asphalt was heated to 160° C.; the heated asphalt was poured into the prepared emulsion for emulsification with an emulsification time of 3 min; and the prepared emulsified asphalt had a solid content of 40%.

2) Preparation of Waterborne Polyurethane Emulsified Asphalt Concrete 70 g of the cationic emulsified asphalt and 200 g of a waterborne polyurethane emulsion were mixed and sufficiently stirred by using a low-speed stirrer for 2 min to prepare a uniform nonviscous brown mixture, which was a waterborne polyurethane emulsification asphalt emulsion.

The waterborne polyurethane emulsification asphalt emulsion was placed in a mixing pot, 1000 g of a mineral aggregate was added, stirring was performed at normal temperature for 60 s, and curing was performed to obtain a waterborne polyurethane emulsified asphalt concrete.

In the above, the mineral aggregate was limestone; the mineral aggregate was composed of a crude aggregate, a fine aggregate, and a filler, the weight ratio of the crude aggregate, the fine aggregate, and the filler was 70:30:5, the crude aggregate had a nominal particle size of >4.75 mm, the fine aggregate had a nominal particle size of $\delta \leq 4.75$ mm, the filler had a nominal particle size of $\delta \leq 0.075$ mm.

In the above, the waterborne polyurethane emulsion was a commercially available linear molecule type waterborne polyurethane emulsion having a solid content of 40%.

Example I-4

1) Preparation of Emulsified Asphalt

Materials were prepared according to the following weight proportion:

| Asphalt | 60 g |
|---|---|
| water | 45 g |
| sodium dibutylnaphthalenesulfonate | 3 g |

Water and sodium dibutylnaphthalenesulfonate were mixed and stirred at 60° C. and were sufficiently dissolved to obtain a uniform emulsion, pH of the emulsion was controlled at 12 by using a sodium hydroxide buffer; an asphalt was heated to 150° C. and poured into the prepared emulsion for emulsification with an emulsification time of 2 min; and the prepared emulsified asphalt had a solid content of 47%.

2) Preparation of Waterborne Polyurethane Emulsified Asphalt Concrete 1000 g of a mineral aggregate, 70 g of a cationic emulsified asphalt, and 10 g of a waterborne polyurethane emulsion were placed in a mixing pot, stirred at normal temperature for 30 s, and cured to obtain a waterborne polyurethane emulsified asphalt concrete;

wherein the mineral aggregate was limestone; the aggregate was composed of a crude aggregate, a fine aggregate, and a filler, the weight ratio of the crude aggregate, the fine aggregate, and the filler was 50:30:5, the crude aggregate had a nominal particle size of >4.75 mm, the fine aggregate had a nominal particle size of $\delta \leq 4.75$ mm, the filler had a nominal particle size of $\delta \leq 0.075$ mm.

In the above, the waterborne polyurethane emulsion was a commercially available linear molecule type waterborne polyurethane emulsion having a solid content of 50%.

Example I-5

1) Preparation of Emulsified Asphalt

Materials were prepared according to the following weight proportion:

| Asphalt | 130 g |
|---|---|
| water | 100 g |
| dodecyl sodium sulfate | 3 g |
| octylphenol polyoxyethylene ether | 3 g |

Water, dodecyl sodium sulfate and octylphenol polyoxyethylene ether were mixed and stirred at 60° C. and were sufficiently dissolved to obtain a uniform emulsion, pH of the emulsion was controlled at 12 by using a sodium hydroxide buffer; an asphalt was heated to 145° C. and poured into the prepared uniform emulsion for emulsification with an emulsification time of 4 min; and the prepared emulsified asphalt had a solid content of 55%.

2) Preparation of Waterborne Polyurethane Emulsified Asphalt Concrete 1000 g of a mineral aggregate, 200 g of a cationic emulsified asphalt, and 200 g of a waterborne polyurethane emulsion were placed in a mixing pot, stirred at normal temperature for 300 s, and cured to obtain a waterborne polyurethane emulsified asphalt concrete;

wherein the mineral aggregate was limestone; the aggregate was composed of a crude aggregate, a fine aggregate, and a filler, the weight ratio of the crude aggregate, the fine aggregate, and the filler was 70:50:10, the crude aggregate had a nominal particle size of >4.75 mm, the fine aggregate had a nominal particle size of δ≤4.75 mm, the filler had a nominal particle size of δ≤0.075 mm.

In the above, the waterborne polyurethane emulsion was a commercially available crosslinking type waterborne polyurethane emulsion having a solid content of 60%.

Comparative Example I-1

An emulsified asphalt was prepared according to the method of Example I-1. 150 g of this asphalt was placed in a mixing pot, 1000 g of a mineral aggregate was added, stirring was performed at normal temperature for 140 s, and curing was performed to obtain a cold-mixed emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 50:50:10, the crude aggregate had a nominal particle size of δ>4.75 mm, the fine aggregate had a nominal particle size of δ≤4.75 mm, the filler had a nominal particle size of δ≤0.075 mm.

Comparative Example I-2

69 g of an asphalt was heated to 165° C. and was added to 1000 g of an aggregate at 175° C., and mixing was performed at 170° C. to obtain a hot-mixed asphalt concrete.

In the above, the mineral aggregate was basalt; the aggregate was composed of a crude aggregate, a fine aggregate, and a filler, the weight ratio of the crude aggregate, the fine aggregate, and the filler was 50:50:10, the crude aggregate had a nominal particle size of δ>4.75 mm, the fine aggregate had a nominal particle size of δ≤4.75 mm, the filler had a nominal particle size of δ≤0.075 mm.

Test Example I-1

The waterborne polyurethane emulsified asphalt concretes prepared in Examples I-1 to I-5 and the emulsified asphalt concretes prepared in Comparative Examples I-1 and I-2 were molded into test pieces according to the specification "Standard Test Methods of Bitumen and Bituminous Mixture for Highway Engineering (JTG E20-2011)", were cured, and the Marshall performance test was performed. The test results are as shown in Table 1.

requirements, and can not be used for road pavement; upon the modification action of the waterborne polyurethane, both the stability and the dynamic stability of the waterborne polyurethane emulsified asphalt concretes prepared in Examples I-1 to I-5 are improved to 2 times more than those of the Comparative Example I-1 or more, demonstrating that the stability at high temperature is significantly superior to that of Comparative Example I-1; furthermore, since the molded rut board of the normal asphalt mixture in Comparative Example I-1 has poor mechanical strength and fails to be cut into qualified trabecular test pieces, the maximal flexural strain thereof can not be measured, while the waterborne polyurethane emulsified asphalt concretes prepared in Examples I-1 to I-5 have a maximal flexural strain up to 2000 or more, which satisfies the technical requirements for asphalt mixtures for pavement; and the cleavage strengths of Examples I-1 to I-5 are significantly higher than those of Comparative Example I-1 and the technical requirements, thereby demonstrating that the waterborne polyurethane emulsified asphalt concrete prepared in this present invention has better water stability.

Comparative Example I-2 is a conventional hot-mixed asphalt concrete, and it can be known from Table 1 that all indices of the waterborne polyurethane emulsified asphalt concrete of this invention are close to or even beyond those of a hot-mixed asphalt concrete.

In summary, the waterborne polyurethane emulsified asphalt concrete prepared in this present invention has high strength as well as good mechanical properties and stability, and achieves the technical effects of a hot-mixed asphalt concrete by using a process of cold mixing due to the modification action of the waterborne polyurethane. It is a road surface material having excellent pavement performance, and may be widely used in the preparation of asphalt concrete pavement materials, asphalt road surface repair materials, slurry seals for curing, micro-surfacing, asphalt mortar for high-speed railways, etc.

Example II-1

2 g of dodecyl sodium sulfate was weighed and added to 50 g of deionized water, they were uniformly stirred at a speed of 1000/min, and dodecyl sodium sulfate was dissolved in water to prepare a soap liquid.

TABLE 1

Results of Marshall Performance Test

| | Technical requirements | Comparative Example I-1 | Comparative Example I-2 | Example I-1 | Example I-2 | Example I-3 | Example I-4 | Example I-5 |
|---|---|---|---|---|---|---|---|---|
| Stability kN | ≥8 | 3.67 | 9.94 | 19.08 | 11.09 | 17.91 | 7.83 | 28.04 |
| Dynamic stability (time/mm) | ≥800 | 1034.8 | 2145 | 48461.5 | 21000 | 24230.8 | 5218.3 | 64250.9 |
| Maximal flexural strain (με) | ≥2000 | — | 2515.9 | 6339.7 | 4488.8 | 4994.2 | 2085 | 8503.1 |
| Cleavage strength percentage | ≥70 | 70% | 86% | 97% | 95% | 92% | 75% | 98% |

Note:
technical requirements are on the basis of "Standard Test Methods of Bitumen and Bituminous Mixture for Highway Engineering (JTG E20-2011)" T0709

It can be seen from Table 1 that the cold-mixed emulsified asphalt concrete prepared in Comparative Example I-1 has poor stability, none of indices thereof reaches the technical 45 g of a mixture of acrylic acid and n-butyl acrylate was weighed and dropwise added to the soap liquid, 0.5 g of ammonium persulfate was weighed and added to the soap liquid in batches after dissolved with a small amount of deionized water, they were stirred at a speed of 1000/min for 3 min, and the mixed liquid was kept at a temperature of 75° C.

After the dropwise addition of the monomers was complete, stirring was continued for 20 min to obtain a white viscous liquid, and pH of the mixed liquid was adjusted to 11 by using a 1% sodium hydroxide solution.

60 g of an asphalt was weighed and slowly added to the above white viscous liquid after heated to 150° C., and was stirred at a speed of 2500/min for 3 min to obtain a waterborne acrylic resin modified emulsified asphalt.

200 g of the prepared waterborne acrylic resin modified emulsified asphalt was weighed and placed in a mixing pot, 1000 g of a mineral aggregate was added, they were stirred at normal temperature for 150 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 50:60:7, the crude aggregate had a nominal particle size of >4.75 mm, the fine aggregate had a nominal particle size of $\delta \leq 4.75$ mm, the filler had a nominal particle size of $\delta \leq 0.075$ mm.

Example II-2

3 g of dodecyl sodium sulfonate was weighed and added to 70 g of deionized water, they were uniformly stirred at a speed of 500/min, and were dissolved in water to prepare an emulsion.

30 g of a mixture of methyl methacrylate and ethyl methacrylate was weighed and dropwise added to the emulsion, 0.7 g of potassium persulfate was weighed and added to the emulsion in batches after dissolved with a small amount of deionized water, they were stirred at a speed of 500/min for 2 min, and the mixed liquid was kept at a temperature of 65° C.

After the dropwise addition of the monomers was complete, stirring was continued for 30 min to obtain a white viscous liquid, and pH of the mixed liquid was adjusted to 12 by using a 1% sodium hydroxide solution.

80 g of an asphalt was weighed and slowly added to the above white viscous liquid after heated to 100° C., and was stirred at a speed of 3000/min for 3 min to obtain a waterborne acrylic resin modified emulsified asphalt.

400 g of the prepared waterborne acrylic resin modified emulsified asphalt was weighed and placed in a mixing pot, 1000 g of a mineral aggregate was added, they were stirred at normal temperature for 300 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 30:50:6, the crude aggregate had a nominal particle size of >4.75 mm, the fine aggregate had a nominal particle size of $\delta \leq 4.75$ mm, the filler had a nominal particle size of $\delta \leq 0.075$ mm.

Example II-3

1 g of dodecyl sodium benzene sulfonate was weighed and added to 40 g of deionized water, they were uniformly stirred at a speed of 750/min, and dodecyl sodium benzene sulfonate was dissolved in water to prepare an emulsion.

60 g of a mixture of acrylic acid, lauryl acrylate and acrylamide was weighed and dropwise added to the emulsion, 0.3 g of sodium persulfate was weighed and added to the emulsion in batches after dissolved with a small amount of deionized water, they were stirred at a speed of 750/min for 5 min, and the mixed liquid was kept at a temperature of 85° C.

After the dropwise addition of the monomers was complete, stirring was continued for 10 min to obtain a white viscous liquid, and pH of the mixed liquid was adjusted to 10 by using a 1% sodium hydroxide solution.

40 g of an asphalt was weighed and slowly added to the above white viscous liquid after heated to 170° C., and was stirred at a speed of 1000/min for 3 min to obtain a waterborne acrylic resin modified emulsified asphalt.

50 g of the prepared waterborne acrylic resin modified emulsified asphalt was weighed and placed in a mixing pot, 1000 g of a mineral aggregate was added, they were stirred at normal temperature for 30 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 70:40:10, the crude aggregate had a nominal particle size of >4.75 mm, the fine aggregate had a nominal particle size of $\delta \leq 4.75$ mm, the filler had a nominal particle size of $\delta \leq 0.075$ mm.

Example II-4

3 g of dodecyl sodium benzene sulfonate was weighed and added to 60 g of deionized water, they were uniformly stirred at a temperature of 70° C., and dodecyl sodium benzene sulfonate was dissolved in water to prepare an emulsion; pH of the emulsion was adjusted to 12 by using a 1% sodium hydroxide solution; and 40 g of an asphalt was weighed and slowly added to the above emulsion after heated to 170° C., and emulsification was performed for 5 min to obtain an emulsified asphalt.

40 g of the emulsified asphalt, 200 g of a waterborne acrylic resin emulsion, and 1000 g of a mineral aggregate were mixed and stirred at normal temperature for 30 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 60:30:9, the crude aggregate had a nominal particle size of >4.75 mm, the fine aggregate had a nominal particle size of $\delta \leq 4.75$ mm, the filler had a nominal particle size of $\delta \leq 0.075$ mm; the waterborne acrylic resin emulsion was a commercially available linear molecule type waterborne acrylic resin emulsion having a solid content of 30%.

Example II-5

1 g of dodecyl sodium sulfonate was weighed and added to 25 g of deionized water, they were uniformly stirred at a temperature of 30° C., and dodecyl sodium sulfonate was dissolved in water to prepare an emulsion; pH of the emulsion was adjusted to 10 by using a 1% sodium hydroxide solution; and 80 g of an asphalt was weighed and slowly added to the above emulsion after heated to 100° C., and emulsification was performed for 2 min to obtain an emulsified asphalt.

200 g of the emulsified asphalt, 10 g of a waterborne acrylic resin emulsion, and 1000 g of a mineral aggregate were mixed and stirred at normal temperature for 300 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 40:70:5, the crude aggregate had a nominal particle size of >4.75 mm, the fine aggregate had a nominal particle size of δ≤4.75 mm, the filler had a nominal particle size of δ≤0.075 mm; the waterborne acrylic resin emulsion was a commercially available linear molecule type waterborne acrylic resin emulsion having a solid content of 70%.

Example II-6

2 g of dodecyl sodium sulfate was weighed and added to 40 g of deionized water, they were uniformly stirred at a temperature of 50° C., and dodecyl sodium sulfate was dissolved in water to prepare an emulsion; pH of the emulsion was adjusted to 11 by using a 1% sodium hydroxide solution; and 60 g of an asphalt was weighed and slowly added to the above emulsion after heated to 140° C., and emulsification was performed for 3 min to obtain an emulsified asphalt.

100 g of the emulsified asphalt, 100 g of a waterborne acrylic resin emulsion, and 1000 g of a mineral aggregate were mixed and stirred at normal temperature for 100 s to obtain a waterborne acrylic resin emulsified asphalt concrete.

In the above, the mineral aggregate was basalt; the mineral aggregate was composed of a crude aggregate, a fine aggregate, and a filler, the weight ratio of the crude aggregate, the fine aggregate, and the filler was 50:50:8, the crude aggregate had a nominal particle size of δ>4.75 mm, the fine aggregate had a nominal particle size of δ≤4.75 mm, the filler had a nominal particle size of δ≤0.075 mm; the waterborne acrylic resin emulsion was a commercially available linear molecule type waterborne acrylic resin emulsion having a solid content of 55%.

Comparative Example II-1

A cold-mixed emulsified asphalt concrete was prepared in the same manner as that of Example II-6, except that the waterborne acrylic resin emulsion was not added.

Comparative Example II-2

60 g of an asphalt was weighed and slowly added to 1000 g of a mineral aggregate after heated to 150° C., and stirring was performed for at normal temperature for 150 s to obtain a hot-mixed asphalt concrete.

In the above, the mineral aggregate was basalt; the mineral aggregate was composed of a crude aggregate, a fine aggregate, and a filler, the weight ratio of the crude aggregate, the fine aggregate, and the filler was 50:60:7, the crude aggregate had a nominal particle size of δ>4.75 mm, the fine aggregate had a nominal particle size of δ≤4.75 mm, the filler had a nominal particle size of δ≤0.075 mm.

Test Example II-1

The waterborne acrylic resin emulsified asphalt concretes prepared in Examples II-1 to II-6, the hot-mixed asphalt concrete prepared in Comparative Example II-1, and the cold-mixed emulsified asphalt concrete prepared in Comparative Example II-2 were molded into test pieces according to the specification "Standard Test Methods of Bitumen and Bituminous Mixture for Highway Engineering (JTG E20-2011)", were cured, and the Marshall performance test was performed. The test results are as shown in Table 2.

TABLE 2

Results of Marshall Performance Test

| | Technical requirements | Comparative Example II-1 | Comparative Example II-2 | Example II-1 | Example II-2 | Example II-3 | Example II-4 | Example II-5 | Example II-6 |
|---|---|---|---|---|---|---|---|---|---|
| Marshall stability kN | ≥8 | 3.67 | 9.94 | 33.76 | 20.58 | 8.59 | 45.34 | 10.07 | 31.25 |

Note:
technical requirements are on the basis of "Standard Test Methods of Bitumen and Bituminous Mixture for Highway Engineering (JTG E20-2011)" T0709

It can be seen from Table 2 that the cold-mixed emulsified asphalt concrete prepared in Comparative Example II-1 has poor stability, the index of Marshall stability thereof does not reach the technical requirements, and can not be used for road pavement; and upon the modification action of the waterborne acrylic resin, the Marshall stability of the waterborne acrylic resin emulsified asphalt concretes prepared in Examples II-1 to II-6 are improved to 2 times more than those of the Comparative Example II-1 or more, and that of Example II-4 may be even up to 12 times or more.

Comparative Example II-2 is a conventional hot-mixed asphalt concrete, and it can be known from Table 2 that all indices of the waterborne acrylic resin emulsified asphalt concrete of this invention are close to or even beyond those of a hot-mixed asphalt concrete.

In summary, the waterborne acrylic resin emulsified asphalt concrete prepared in this present invention has high strength and good mechanical properties, achieves the technical effects of a hot-mixed asphalt concrete by the modification action of the waterborne acrylic resin by using a process of cold mixing. It is a road surface material having excellent pavement performance, and may be widely used in the preparation of asphalt concrete pavement materials, asphalt road surface repair materials, slurry seals for curing, micro-surfacing, asphalt mortar for high-speed railways, etc.

Example III-1

1. Preparation of Waterborne Epoxy Resin Emulsion 100 g of a waterborne epoxy resin and 150 g of diethylene triamine were mixed, the mixed emulsion was sufficiently stirred by using a low-speed stirrer for 7.5 min, and the mixture was allowed to be uniform to obtain a waterborne epoxy resin emulsion.

In the above, The waterborne epoxy resin was a standard liquid epoxy resin having a solid content of 75%;

wherein diethylene triamine had a solid content of 50%.

2. Preparation of Epoxy Emulsified Asphalt 50 g of the waterborne epoxy resin emulsion was poured into 120 g of an anionic emulsified asphalt, and uniform stirring was performed to prepare a waterborne epoxy emulsified asphalt.

3. Preparation of Micro-Surfacing Mixture

Materials were prepared according to the following weight proportion:

| | |
|---|---|
| mineral aggregate | 1000 g |
| water | 80 g |
| waterborne epoxy emulsified asphalt | 170 g |

Water was added to the mineral aggregate, uniform stirring was performed at normal temperature, the waterborne epoxy resin emulsified asphalt was further added, and stirring was continued for 100 s to obtain a micro-surfacing mixture.

In the above, the mineral aggregate was composed of a crude aggregate, a fine aggregate, and a filler; wherein the weight ratio of the crude aggregate, the fine aggregate, and the filler was 20:40:10; the crude aggregate had a nominal particle size of 4.75 mm<δ≤9.5 mm; the fine aggregate had a nominal particle size of δ≤4.75 mm; the filler had a nominal particle size of δ≤0.075 mm.

Example III-2

1. Preparation of Waterborne Epoxy Resin Emulsion 10 g of a waterborne epoxy resin and 20 g of polyamide-650 were mixed, the mixed emulsion was sufficiently stirred by using a low-speed stirrer for 5 min, and the mixture was allowed to be uniform to obtain a waterborne epoxy resin emulsion.

In the above, The waterborne epoxy resin was a water-soluble epoxy resin having a solid content of 50%;

wherein polyamide-650 had a solid content of 70%.

3. Preparation of Epoxy Emulsified Asphalt 10 g of the waterborne epoxy resin emulsion was poured into 120 g of an anionic emulsified asphalt, and uniform stirring was performed to prepare a waterborne epoxy emulsified asphalt.

4. Preparation of Micro-Surfacing Mixture

Materials were prepared according to the following weight proportion:

| | |
|---|---|
| mineral aggregate | 1000 g |
| cement | 20 g |
| water | 60 g |
| waterborne epoxy emulsified asphalt | 130 g |

The cement was added to the mineral aggregate, uniform stirring was performed at normal temperature, water was further added, stirring was continued to form a uniform mixture, the waterborne epoxy resin emulsified asphalt was further added, and stirring was continued for 30 s to obtain a micro-surfacing mixture.

In the above, the mineral aggregate was composed of a crude aggregate, a fine aggregate, and a filler; wherein the weight ratio of the crude aggregate, the fine aggregate, and the filler was 10:55:5, the crude aggregate had a nominal particle size of 4.75 mm<δ≤9.5 mm; the fine aggregate had a nominal particle size of δ≤4.75 mm; the filler had a nominal particle size of δ≤0.075 mm.

Example III-3

1. Preparation of Waterborne Epoxy Resin Emulsion 100 g of a waterborne epoxy resin and 100 g of N,N'-dihydroxyethyl diethylene triamine were mixed, 300 g of water was further added, the mixed emulsion was sufficiently stirred by using a low-speed stirrer for 10 min, and the mixture was allowed to be uniform to obtain a waterborne epoxy resin emulsion.

In the above, The waterborne epoxy resin was a water-soluble epoxy resin having a solid content of 100%;

wherein N,N'-dihydroxyethyl diethylene triamine has a solid content of 30%.

4. Preparation of Epoxy Emulsified Asphalt 10 g of the waterborne epoxy resin emulsion was poured into 100 g of an anionic emulsified asphalt, and uniform stirring was performed to prepare a waterborne epoxy emulsified asphalt.

5. Preparation of Micro-Surfacing Mixture

Materials were prepared according to the following weight proportion:

| | |
|---|---|
| mineral aggregate | 1000 g |
| mineral fiber | 30 g |
| water | 110 g |
| waterborne epoxy emulsified asphalt | 110 g |

The mineral fiber was added to the mineral aggregate, uniform stirring was performed at normal temperature, water was further added, stirring was continued to form a uniform mixture, the waterborne epoxy resin emulsified asphalt was further added, and stirring was continued for 180 s to obtain a micro-surfacing mixture.

In the above, the mineral aggregate was composed of a crude aggregate, a fine aggregate, and a filler; wherein the weight ratio of the crude aggregate, the fine aggregate, and the filler was 30:85:15; the crude aggregate has a nominal particle size of 4.75 mm<δ≤9.5 mm; the fine aggregate has a nominal particle size of δ≤4.75 mm; the filler has a nominal particle size of δ≤0.075 mm.

Example III-4

1. Preparation of Waterborne Epoxy Resin Emulsion 100 g of a waterborne epoxy resin and 150 g of polyamide 650 were mixed, 100 g of water was further added, the mixed emulsion was sufficiently stirred by using a low-speed stirrer for 7.5 min, and the mixture was allowed to be uniform to obtain a waterborne epoxy resin emulsion.

In the above, the waterborne epoxy resin was a water-soluble epoxy resin having a solid content of 75%;

wherein polyamide 650 had a solid content of 50%.

2. Preparation of Micro-Surfacing Mixture

Materials were prepared according to the following weight proportion:

| | |
|---|---|
| mineral aggregate | 1000 g |
| aluminum sulfate | 10 g |
| water | 110 g |
| waterborne epoxy resin emulsion | 120 g |
| anionic emulsified asphalt | 100 g |

Aluminum sulfate was added to the mineral aggregate, water was added after uniform stirring, the waterborne epoxy resin emulsion and the emulsified asphalt were further added after uniform stirring, and stirring was performed for 120 s to obtain a micro-surfacing mixture.

In the above, the mineral aggregate was composed of a crude aggregate, a fine aggregate, and a filler; wherein the weight ratio of the crude aggregate, the fine aggregate, and the filler was 10:85:5, the crude aggregate has a nominal particle size of 4.75 mm<δ≤9.5 mm; the fine aggregate has a nominal particle size of δ≤4.75 mm; the filler has a nominal particle size of δ≤0.075 mm.

Example III-5

1. Preparation of Waterborne Epoxy Resin Emulsion 10 g of a waterborne epoxy resin and 20 g of polyamide 650 were mixed, 50 g of water was further added, the mixed emulsion was sufficiently stirred by using a low-speed stirrer for 5 min, and the mixture was allowed to be uniform to obtain a waterborne epoxy resin emulsion.

In the above, The waterborne epoxy resin was a water-soluble epoxy resin having a solid content of 100%;

wherein polyamide 650 had a solid content of 70%.

2. Preparation of Micro-Surfacing Mixture

Materials were prepared according to the following weight proportion:

| | |
|---|---|
| mineral aggregate | 1000 g |
| polyacrylamide | 20 g |
| water | 60 g |
| waterborne epoxy resin emulsion | 5 g |
| anionic emulsified asphalt | 150 g |

A water solution of an emulsifier was added to the mineral aggregate, water was added after uniform stirring, the waterborne epoxy resin emulsion and the emulsified asphalt were further added after uniform stirring, and stirring was performed for 50 s to obtain a micro-surfacing mixture.

In the above, the mineral aggregate was composed of a crude aggregate, a fine aggregate, and a filler; wherein the weight ratio of the crude aggregate, the fine aggregate, and the filler was 30:55:15; the crude aggregate has a nominal particle size of 4.75 mm<δ≤9.5 mm; the fine aggregate has a nominal particle size of δ≤4.75 mm; the filler has a nominal particle size of δ≤0.075 mm.

Comparative Example III-1

Materials were prepared according to the following weight proportion:

| | |
|---|---|
| mineral aggregate | 1000 g |
| water | 80 g |
| SBR modified emulsified asphalt | 170 g | wherein the content of SBR comprised 4% of the emulsified asphalt, and the SBR modified emulsified asphalt had a solid content of 50%.

Water was added to the mineral aggregate, a uniform mixture was formed by stirring, the SBR modified emulsified asphalt was further added, and stirring was continued for 100 s to obtain the one of interest.

In the above, the mineral aggregate was composed of a crude aggregate, a fine aggregate, and a filler; wherein the weight ratio of the crude aggregate, the fine aggregate, and the filler was 20:40:10; the crude aggregate has a nominal particle size of 4.75 mm<δ≤9.5 mm; the fine aggregate has a nominal particle size of δ≤4.75 mm; the filler has a nominal particle size of δ≤0.075 mm.

Test Example III-1 Determination of Wear Resistant Property

A 1 h wet rut abrasion value was used to evaluate the abrasion resistant property of micro-surfacing, and a smaller 1 h wet rut abrasion value indicates a better abrasion resistant property. The method of determination was JTG E20-2011 "Standard Test Methods of Bitumen and Bituminous Mixture for Highway Engineering" T0752-2011. The test results are as shown in Table 3.

It can be known from Table 3 that the micro-surfacing mixture of this invention has significantly improved wear resistance compared to that of Comparative Example, and the 1 h wet rut abrasion value thereof is less than half of that of Comparative Example III-1.

Test Example III-2 Determination of Water Damage Resistant Property

A 6 d wet rut abrasion value was used to evaluate the abrasion resistant property of micro-surfacing, and a smaller 6 d wet rut abrasion value indicates a better abrasion resistant property. The method of determination was JTG E20-2011 "Standard Test Methods of Bitumen and Bituminous Mixture for Highway Engineering" T0752-2011. The test results can be seen in Table 3.

It can be known from Table 3 that the micro-surfacing mixture of this invention has significantly improved water damage resistant property compared to that of Comparative Example, and the 1 h wet rut abrasion value is reduced by more than 25% with respect to that of Comparative Example III-1.

Test Example III-3 Determination of Rut Resistant Property

A width deformation rate in a rut deformation test was used to evaluate the rut resistant property of micro-surfacing, and a smaller rut deformation rate indicates a better rut resistant property. The method of determination was JTG E20-2011 "Standard Test Methods of Bitumen and Bituminous Mixture for Highway Engineering" T0756-2011. The test results can be seen in Table 3.

It can be known from Table 3 that rut deformation rates of the micro-surfacing mixtures of this invention are all lower than that of Comparative Example III-1, in which the Example III-4 has the best effect, and the rut deformation rate is reduced by 34.61% compared to Comparative Example III-1.

TABLE 3

Experiment Results of Micro-surfacing

| Evaluation indices | Comparative Example III-1 | Example III-1 | Example III-2 | Example III-3 | Example III-4 | Example III-5 |
|---|---|---|---|---|---|---|
| 1 h wet rut abrasion value (g/m²) | 450.6 | 66.5 | 83.5 | 201.2 | 54.7 | 89.1 |
| 6 d wet rut abrasion value (g/m²) | 780.6 | 240.6 | 351.9 | 560.2 | 180.7 | 453.9 |
| Rut deformation rate (%) | 5.2 | 3.8 | 4.4 | 5.1 | 3.4 | 4.7 |

The invention claimed is:

1. A waterborne epoxy resin emulsified asphalt micro-surfacing mixture, wherein the waterborne epoxy resin emulsified asphalt micro-surfacing mixture, wherein the waterborne epoxy resin emulsified asphalt micro-surfacing mixture comprises raw materials having the ratio of parts by weight as follows:

| | |
|---|---|
| a mineral aggregate | 100 |
| an anionic emulsified asphalt | 10-15 |
| a waterborne epoxy resin emulsion | 0.5-12 |
| water | 6-11, | wherein the micro-surfacing mixture is produced by a method comprising the steps as follows: 1a) preparing the mineral aggregate suitable for mixing; 2a) mixing the waterborne epoxy resin emulsion and the emulsified asphalt, and uniformly stirring to obtain a water epoxy resin emulsified asphalt for stand-by; 3a) adding water to the prepared mineral aggregate, and sufficiently stirring to wet the mineral aggregate; and 4a) adding the waterborne epoxy resin modified emulsified asphalt to the wetted mineral aggregate, uniformly stirring, and curing, so as to obtain the micro-surfacing mixture; wherein the time of stirring in step 4a) is 30 s-180 s; or 1b) preparing the mineral aggregate suitable for mixing; 2b) adding water to the prepared mineral aggregate, and sufficiently stirring to wet the mineral aggregate; 3b) adding the waterborne epoxy resin emulsion and the emulsified asphalt to the wetted mineral aggregate, uniformly stirring, and curing, so as to obtain a micro-surfacing mixture; wherein the time of stirring in step 3b) is 30 s-180 s, wherein the weight ratio of the mineral aggregate suitable for mixing, the waterborne epoxy resin emulsion, the emulsified asphalt and the water is 100:0.5-12:10-15:6-11.

2. The micro-surfacing mixture as claimed in claim 1, wherein the mixture further comprises an additive, and the weight ratio of the mineral aggregate to the additive is 100:1-3, and/or
the mineral aggregate is composed of a crude aggregate, a fine aggregate, and a filler; wherein the weight ratio of the crude aggregate, the fine aggregate, and the filler is 10-30:55-85:5-15; the crude aggregate has a nominal particle size of 4.75 mm<δ; the fine aggregate has a nominal particle size of δ≤4.75 mm; the filler has a nominal particle size of δ≤0.075 mm, and/or
the waterborne epoxy resin emulsion comprises a waterborne epoxy resin and a waterborne epoxy curing agent, wherein the weight ratio of the waterborne epoxy resin to the waterborne epoxy curing agent is 1:1-2.

3. The micro-surfacing mixture as claimed in claim 2, wherein the waterborne epoxy resin is a water-soluble epoxy resin or a standard liquid resin having a solid content of 50-100%; and/or the waterborne epoxy curing agent is a curing agent emulsion having a solid content of 30-70%, wherein the curing agent emulsion comprises polyamine or polyamide.

4. The micro-surfacing mixture as claimed in claim 1, wherein the mineral aggregate suitable for mixing of step 1a) and/or 1b) is prepared by adding an additive after mixing a crude aggregate, a fine aggregate and a filler, and/or
the waterborne epoxy resin emulsion of step 2a) and/or 3b) is formed by mixing and stirring a waterborne epoxy resin and a waterborne epoxy curing agent with a stirring time of 5-10 min; wherein the weight ratio of the waterborne epoxy resin and the waterborne epoxy resin and the waterborne epoxy curing agent is 1: 1-2.

* * * * *